United States Patent

[11] 3,575,531

| [72] | Inventor | Eliot K. Buckingham |
| | | Springfield, Vt. |
| [21] | Appl. No. | 782,979 |
| [22] | Filed | Dec. 11, 1968 |
| [45] | Patented | Apr. 20, 1971 |
| [73] | Assignee | Bird Machine Company |
| | | South Walpole, Mass. |

[54] MOTOR AND GEAR SYSTEM
8 Claims, 1 Drawing Fig.

[52] U.S. Cl. ................................................. 416/170,
74/411
[51] Int. Cl. ........................................................ B63h 21/28
[50] Field of Search .......................................... 416/170;
74/411, 421.5

[56] References Cited
UNITED STATES PATENTS

| 2,001,736 | 5/1935 | Larason | 416/170 |
| 2,320,379 | 6/1943 | Niekamp | 74/421(.5) |
| 2,926,542 | 3/1960 | Schmitter et al. | 74/421(.5) |
| 3,234,808 | 2/1966 | Nelson | 74/421(.5) |
| 3,330,166 | 7/1967 | Rockwell et al. | 74/421.(.5) |
| 3,333,482 | 8/1967 | Wildhaber | 74/421(.5) |
| 3,364,772 | 1/1968 | Easton | 74/421(.5) |
| 3,434,366 | 3/1969 | Raso et al. | 74/421(.5) |

FOREIGN PATENTS

| 168,979 | 1921 | Great Britain | 416/170 |

Primary Examiner—Everette A. Powell, Jr.
Attorney—Edgar H. Kent

ABSTRACT: A high horsepower motor and gear system is provided in which the motor has a hollow drive shaft and the first stage drive gear has a long shaft extending through the hollow drive shaft and fixedly attached thereto at its far end, the latter shaft being sufficiently resilient to absorb positional errors which would otherwise result in high dynamic load exerted between the first gear pair. The system permits reduction in gear size which would otherwise be required, close coupling and ease of alignment between the two mentioned shafts and between the first stage drive and driven gears, being particularly useful as the drive for an aerator impeller.

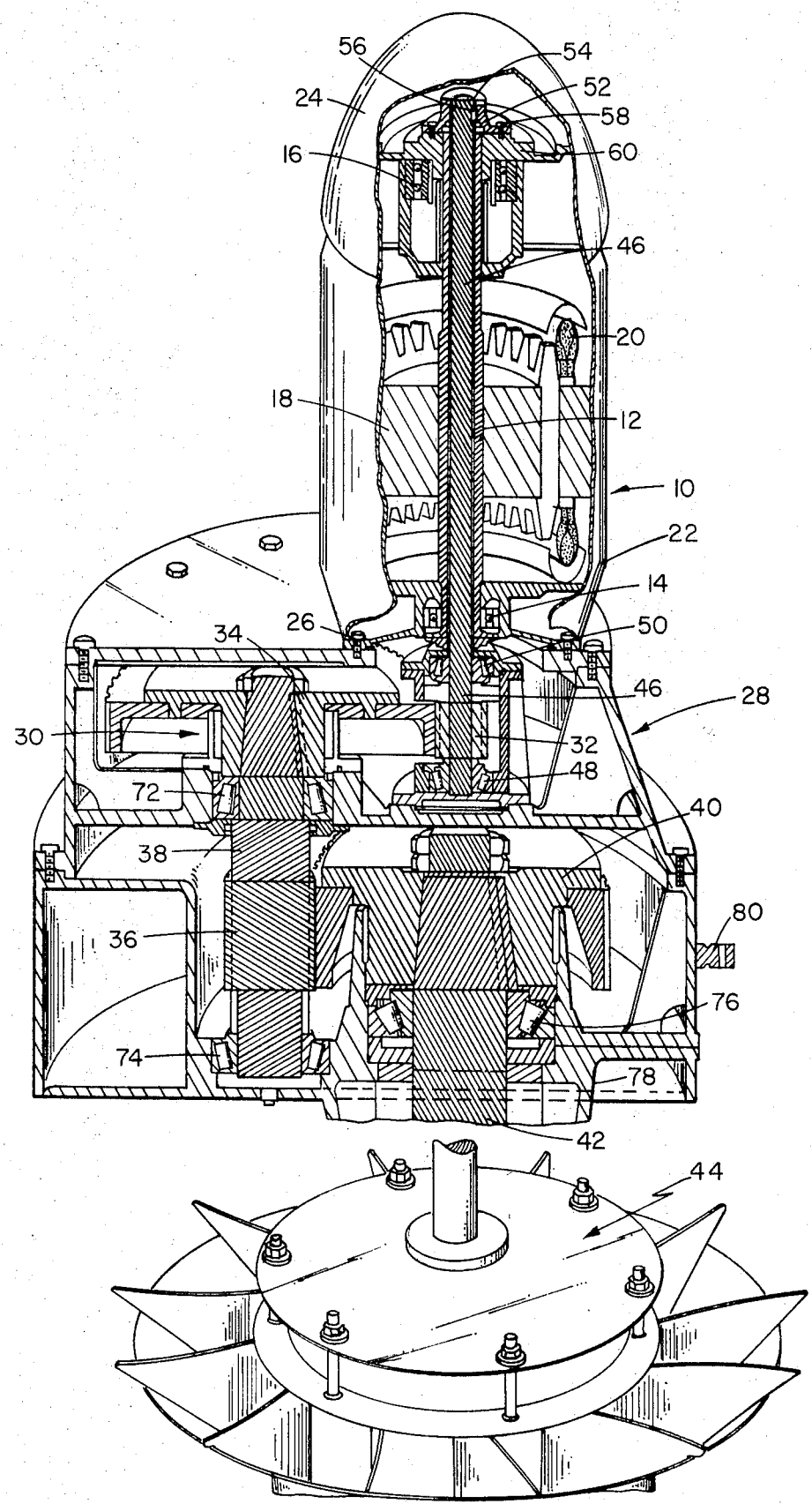

MOTOR AND GEAR SYSTEM

This invention relates to motor and gear systems having motors of high horsepower, such as 5 to 200 or more H.P., which require relatively large and expensive gears. A particularly useful application of the invention is in the drive for an aerator.

The gears of such a system must be of such size and material quality that the teeth thereof will resist breaking and will not wear excessively under maximum load conditions. Ideally, maximum load would be equal to applied load. However, errors in action of the gears due to errors in the form and spacing of the gear teeth, their deflection under load, misalignment and deflection of their shafts, cause actual loads on the gear teeth to vary in intensity from a low, which may be no-load, to a high which may be several times the applied load. The dynamic load, which the gear teeth must be designed to withstand is a controlling factor determining the size and cost of the gears. In addition to the expense, high dynamic loads are likely to produce physical separations of the gear teeth with resultant noise and deleterious effect on the gears.

An object of this invention is to provide novel structure for such motor and gear systems which reduces dynamic load without requiring greater precision in the formation of the gears and alignment of their shafts, thus in turn reducing the required size and cost of the gears while increasing gear life due to reduced wear. Another object is to provide such structure which greatly simplifies obtaining accuracy of alignment between the axes of the first stage drive gear and the motor shaft where inaccuracy has been a primary contributor to high dynamic load in the past. Still another object is to provide such a structure which enables close coupling of the motor and gear train and facilitates assembly and disassembly of the motor from the gears.

In attaining the foregoing and other objects and advantages the invention utilizes a motor with a hollow drive shaft and provides the drive gear or pinion of the first pair of gears of the gear train with a long shaft which extends through the hollow motor shaft and is rigidly secured to the motor shaft at its far end. The drive gear shaft functions as a torsion bar to absorb or damp sudden torque load of sufficient magnitude to twist or deform the bar about its axis. Provided the resistance of the shaft to such torsional deformation is sufficiently low (i.e., its resilience is sufficiently high) it effects a major reduction in the dynamic load as compared with a nonresilient connection between a solid motor shaft and drive gear as has been usual in the prior art. The extra length of the shaft due to its extension through the motor shaft is an important factor in such reduction since, for a given diameter steel shaft, the resistance to torsional distortion varies inversely with its length without affecting shear stress, which is independent of length. The reduction in dynamic load in turn enables reduction of gear and pinion tooth width and length required to withstand it, and consequently enables reduction in size (diameter and thickness) of the gears and of the gear box housing them, thus reducing both size and cost of the assembly.

While it is possible to obtain a similar reduction in dynamic load, although usually not as great, by interposing a flexible coupling between the pinion and the adjacent end of a solid motor shaft, the structure of the present invention has important advantages over the use of such a coupling. Such couplings normally utilize rubber or flexible plastic and do not have the wear life nor reliability of the torsion shaft coupling of this invention. Furthermore, flexible couplings are difficult to apply with proper alignment and their length prevents close coupling between the motor and the gear train.

Such close coupling is important in many cases, particularly for the motor and gear systems of large aerators wherein the motor is desirably mounted over the gear train with its shaft aligned with the axes of the first stage drive gear and of the driven impeller shaft. With the construction of this invention, the motor can be so mounted with only a fraction of an inch of spacing between the lower end of the motor shaft and the upper bearing for the first stage drive gear shaft in the gear box. If instead, a flexible coupling is interposed between the motor drive shaft and the first stage drive gear shaft this spacing is increased to the order of 4 to 6 inches or more. This not only necessitates corresponding extra surrounding casing for protection of the coupling from the elements but also substantially increases the likelihood that strain will cause distortion of the alignment between the motor shaft and drive gear shaft with potential injury to the shaft and coupling. Close coupling which this invention permits is of particular consequence if the aerator is mounted on a float where stability demands as low a center of gravity as possible for the motor and gear system and where the strains on the system due to rocking of the float can be very great.

In constructing the system, the gear box may be assembled complete before the motor is attached, with the first stage drive gear and its shaft properly aligned with respect to the other gears and shafts and fixed in place between its bearings. Assembly of the first stage drive gear shaft to the motor simply requires extending that shaft through the motor shaft and, with the motor cover removed, securing the shafts coaxially together at the exposed far end of the motor shaft. Such procedure is much simpler and more accurate than has been possible with prior systems.

The foregoing and other objects and advantages of the invention will be more fully appreciated from the following particular description in conjunction with the accompanying drawing.

The single FIGURE of the drawing shows in elevation with parts broken away and in vertical section, a motor and gear system according to this invention utilized to rotate a cone-type aerator impeller.

Referring to the accompanying drawing, the motor, designated generally 10, is shown as an electric motor and has a hollow drive shaft 12 mounted adjacent its opposite ends in bearings 14, 16 and carrying intermediate the bearings the rotor 18 operated by the induction coils of stator 20. The motor has a casing 22 with a removable top portion 24, casing 22 being mounted as by bolts 26 on the flat top of a gear box 28 which houses the gear train designated generally 30.

Gear train 30 is in this instance speed reduction gearing having a first stage drive gear or pinion 32, a first stage driven gear 34, a second stage drive gear 36 on the shaft 38 of gear 34 and a second stage driven gear 40 on a shaft 42 which is connected coaxially to the shaft of rotary aerator impeller 44 that constitutes the load through intermediate connections (not shown). Drive gear 32 is keyed on a shaft 46 between thrust bearings 48, 50 supporting the shaft 46 in the gear box 28. From the upper bearing 50, shaft 46 extends vertically coaxially through hollow drive shaft 12 of motor 10 and is removably rigidly attached at its upper end to shaft 12 by means of a cap 52 having a tubular opening 54 to receive the end of shaft 46 with a close fit. The cap is keyed to the shaft by a key 56 received in slots in the shaft and in the wall of opening 54, and is fastened by bolts 58 to a flange 60 carried by shaft 12.

The motor and gear box are assembled by bringing the two together with shaft 46 coaxially aligned with the motor hollow shaft 12 so that shaft 46 is projected through shaft 12. The motor is then fastened to the gear box by bolts 26 extending into the top of the gear box. With top portion 24 of the motor cover removed, cap 52 is applied to shaft 46 by sliding opening 54 over the shaft end with key 56 in registry with the slot therein and fastened to flange 60 by bolts 58. Cap 52 and its mounting connections are so designed that its opening 54 is exactly concentric with shaft 12 and due to the close fit with the end of the shaft 46, there is negligible possibility for eccentricity between the two shafts.

Shaft 38 of gear 34 is mounted in thrust bearings 72, 74 and shaft 42 of gear 40 is mounted in an upper thrust bearing 76, the axes of these shafts being parallel to each other and to the axis of shaft 46, shaft 42 being coaxially aligned with shaft 46. Gear box 28 may be mounted on supporting framework of a float or bridge by means of lugs 80 provided with bolt-receiving apertures.

Gear box 28 completely encloses the gear train except for the openings through which shafts 42 and 46 project. The former opening (at the lower end of a housing extension partially shown at 78) may be sealed weather-tight about shaft 42 by a suitable seal while the latter opening is sealed weather-tight between the motor cover and gear box top. It will be noted that the coupling between motor shaft 12 and the gear train is very close, there being only slight clearance between the lower end of shaft 12 and upper bearing 50 of shaft 46. Such close coupling which this invention permits is desirable for reasons previously set forth.

If it should become necessary to disassemble the motor and gear train for servicing or inspection, this is a simple matter of removing motor cover portion 24, removing bolts 58 and cap 52, removing bolts 26 and lifting the motor off the gear box so that shaft 46 is withdrawn from hollow shaft 12. This is considerably simpler than taking apart a coupling between motor shaft and drive gear shaft or taking apart the first stage drive gear assembly as has been required heretofore.

In a typical example, a motor and gear system as shown in the drawing, the gear train 30 was designed to reduce the drive speed of shaft 12 of a 75 horsepower motor 10 from 1160 r.p.m. to about 40 r.p.m. on the aerator impeller shaft. Shaft 12 had an inner diameter of 1⅞ inches. Shaft 46 had an effective torsion bar length of about 39 inches between its attachments to drive gear 32 and to shaft 12. The diameter of shaft 46 was 1⅝ inches providing clearance between shaft 46 and shaft 12 as is desirable both for ease of assembly and to permit shaft 46 to twist freely without interference due to frictional contact with shaft 12.

The dynamic load between teeth of the first stage gears was computed from known factors in the usual way and compared with the values computed in the same way with systems of the prior art having the same applied load and differing from the example system only in that the motor had a solid shaft to an end of which the drive gear was nonresiliently fixed in one case and connected by a commercial resilient coupling (Falk) in the other. The shaft 46 of the example system had a torsional spring rate (torque required to deform) of 580 pounds as against 800 pounds for the flexible coupling. The dynamic load for the inflexible connection system was 7,362 pounds, for the flexible coupling system was 4,253 pounds and for the example system was 4,093 pounds. In terms of ratios of dynamic load to applied load, which is a measure of the effectiveness of the systems, the corresponding figures were 2.056 for the inflexible connection system, which is high and poor, 1.19 for the flexible coupling system and 1.14 for the example system, both of which are low and good, with the example system better. The results would be essentially the same if helical gears were used instead of spur gears as shown.

In the example system it would have been possible to reduce the dynamic load still more by reducing the diameter of shaft 46 and thus reducing the torsional spring rate (which varies inversely with the 4th power of the diameter) while still maintaining an adequate margin of resistance to shear strength (which varies inversely with the cube of the diameter).

I claim:

1. A motor and gear system which comprises a motor of at least 5 horsepower having a hollow drive shaft and a gear train connecting said shaft to a load, the drive gear of said train having a shaft which extends coaxially through said hollow drive shaft, said shafts being secured together only at their ends remote from said drive gear to connect said motor operatively to said gear train, said drive gear shaft and the other gears of said train being mounted with their axes in fixed parallel relation, said drive gear shaft having a resistance to torsional distortion sufficiently low to absorb to a substantial extent dynamic load which would otherwise be exerted between teeth of said drive gear and a mating gear of said train.

2. A motor and gear system according to claim 1 wherein said motor and gear train are close coupled with said drive gear closely adjacent the near end of said motor shaft.

3. A motor and gear system according to claim 2 wherein said load is the shaft of a rotary aerator impeller.

4. A motor and gear system according to claim 3 wherein said gear train has a casing, said motor has a casing mounted on top of said gear train casing and the axes of said shafts are vertically disposed.

5. A motor and gear system according to claim 4 wherein the axes of all said shafts are in vertical alignment.

6. A motor and gear system according to claim 3 wherein said gear system rotates said impeller shaft at a substantially slower speed than the rotational speed of said motor shaft.

7. A motor and gear system according to claim 1 wherein said drive gear shaft is mounted in a bearing fixed between said drive gear and the secured-together ends of said shafts.

8. A motor and gear system according to claim 1 wherein the ratio of dynamic load to applied load is not substantially greater than 1.